US008875197B2

(12) United States Patent
DeLorme

(10) Patent No.: US 8,875,197 B2
(45) Date of Patent: Oct. 28, 2014

(54) SYSTEMS, METHODS AND COMPUTER PRODUCTS FOR MOSAICS OF LIVE VIEWS OF TRAFFIC

(75) Inventor: David DeLorme, Stone Mountain, GA (US)

(73) Assignee: AT&T Intellecutal Property I, L.P., Atlanta, GA (US)

( * ) Notice: Subject to any disclaimer, the term of this patent is extended or adjusted under 35 U.S.C. 154(b) by 1360 days.

(21) Appl. No.: 11/832,985

(22) Filed: Aug. 2, 2007

(65) Prior Publication Data

US 2009/0033517 A1 Feb. 5, 2009

(51) Int. Cl.
*H04N 7/173* (2011.01)
*G08G 1/01* (2006.01)
*H04N 7/18* (2006.01)

(52) U.S. Cl.
CPC . *G08G 1/01* (2013.01); *H04N 7/181* (2013.01)
USPC ............ 725/86; 725/52; 725/100; 725/117; 725/131; 725/135; 725/146; 725/151

(58) Field of Classification Search
USPC ............ 725/52, 86, 100, 117, 131, 135, 139, 725/146, 151
See application file for complete search history.

(56) References Cited

U.S. PATENT DOCUMENTS

| | | | | |
|---|---|---|---|---|
| 5,396,429 A * | 3/1995 | Hanchett | ........................ | 701/117 |
| 2003/0007663 A1* | 1/2003 | Wixson et al. | ................ | 382/100 |
| 2003/0023742 A1* | 1/2003 | Allen et al. | .................... | 709/231 |
| 2004/0010366 A1* | 1/2004 | Videtich | ........................ | 701/210 |
| 2006/0143959 A1* | 7/2006 | Stehle et al. | ..................... | 40/600 |
| 2007/0107019 A1* | 5/2007 | Romano et al. | .................. | 725/80 |
| 2007/0118281 A1* | 5/2007 | Adam et al. | ................... | 701/211 |
| 2008/0263472 A1* | 10/2008 | Thukral et al. | ................ | 715/774 |

OTHER PUBLICATIONS

TrafficLand.pdf, Consumer Website, TrafficLand, Inc., Apr. 23, 2007, http://web.archive.org/web/20070423225024/http://corporate.trafficland.com/servies/consumer.html.*

* cited by examiner

*Primary Examiner* — Jivka Rabovianski
(74) *Attorney, Agent, or Firm* — Cantor Colburn LLP

(57) ABSTRACT

Systems, methods and computer products for mosaics of live views of traffic via Internet Protocol Television. Exemplary embodiments include a network-based method for providing traffic views, the method including receiving a request to display a traffic views mosaic on a communications device, retrieving traffic views data and providing the traffic views data to the communications device.

16 Claims, 8 Drawing Sheets

SYSTEMS, METHODS AND COMPUTER PRODUCTS FOR MOSAICS OF LIVE VIEWS OF TRAFFIC

BACKGROUND

The present invention relates generally to telecommunications, and more particularly to systems, methods and computer products for mosaics of live views of traffic via Internet Protocol Television.

In modern society many people rely on automobiles to travel to work, school, etc. For example, families with multiple members may have to use several travel routes in order to go to multiple jobs and multiple schools. During many times of day, particularly "rush hours", there may be heavy volumes of traffic. People rely on television and radio to monitor traffic along their travel routes and often have alternate routes in case one route is subject to heavy traffic. People must then actively monitor television and radio in order to determine which routes have what types of traffic. This process can be time consuming and burdensome.

Contemporary cable and satellite television systems generally utilize a set-top box on the subscriber's premises. Sometimes limited set-top box functionality is built into the television, but the set-top box and the television are generally separate devices. The set-top box performs authentication, authorization, and accounting functions. However, a primary function of the set-top box (at least from the customer's viewpoint) is channel selection, including presenting the list of channels available to the customer. This list is often referred to as the electronic programming guide (EPG). Furthermore, Internet Protocol Television (IPTV) utilizes set-top boxes to decode programming delivered over the IP network. This additional power can be leveraged to provide more flexible services to customers. IPTV set top boxes are being designed to allow functions such as access to Internet content (weather, maps, video, music), and access to local video content.

While contemporary cable and satellite television systems offer news channels that can be used to monitor traffic, subscribers typically have to search news channels for information that is specific to their travel routes. Contemporary television systems do not offer the ability to provide travel route availability on communication devices such as IPTV-enabled televisions.

It is therefore desirable to provide a means for providing live traffic view services and capabilities to IPTV devices.

BRIEF SUMMARY

Exemplary embodiments include a network-based method for providing traffic views, the method including receiving a request to display a traffic views mosaic on a communications device, retrieving traffic views data and providing the traffic views data to the communications device.

Additional exemplary embodiments include a system for providing traffic views to an Internet Protocol-enabled device, the system including a computer processing device and a mosaic of live view of traffic services application executing on the computer processing device, mosaic of live view of traffic services application receiving a request to display a traffic views mosaic on a communications device, retrieving traffic views data and providing the traffic views data to the communications device.

Further exemplary embodiments include computer program product for providing network services to an Internet Protocol-enabled device, the computer program product including instructions for causing a computer to implement a method, the method including receiving a request to display a traffic views mosaic on a communications device, retrieving traffic views data and providing the traffic views data to the communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems, methods and computer products for providing mosaics of live views of traffic via Internet Protocol Television (IPTV). The exemplary embodiments described herein provide a subscriber the ability to capture traffic views along a desired travel route and display the traffic views on a suitable communications device (e.g., IPTV-enabled television, personal computer, etc.) The traffic views can be downloaded from a network where an authorized provider (e.g., a department of transportation, etc.) has uploaded the traffic views. The user can customize the traffic views as needed on the communications device, display the views as a mosaic, and store multiple routes.

Figure 1:
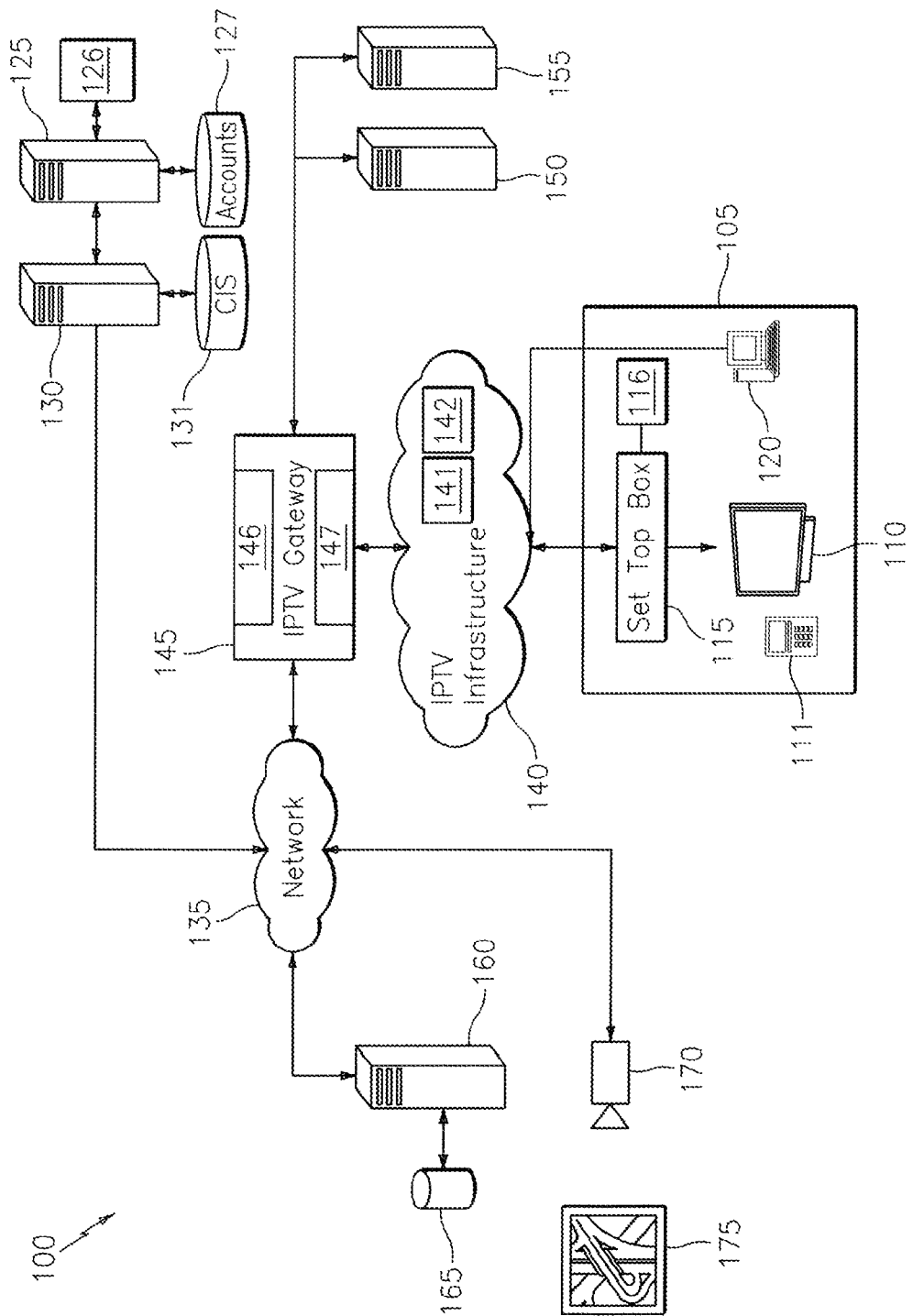
FIG. 1 illustrates a block diagram of an exemplary embodiment of a traffic mosaic display system, which implements mosaics of live views of traffic via Internet Protocol Television.

Turning now to FIG. 1, a block diagram of an exemplary traffic mosaic display system, which implements mosaics of live views of traffic via Internet Protocol Television in accordance with exemplary embodiments is now described. For ease of illustration, the system of FIG. 1 depicts a simplified network infrastructure. It is understood that a variety of network components/nodes may be utilized in implementing the embodiment described herein. For example, in an exemplary embodiment, a system 100 includes a means for accessing network services for multiple disparate devices using a single sign on procedure. Therefore, the system 100 manages accounts, each of which is established for a community of devices and/or device subscribers, such as those devices and subscribers in a subscriber location 105, which may include a communications device 110 (e.g., an IPTV-enabled television) coupled to a set top box 115. The subscriber location 105 can further include a subscriber computer 120. Other services can be provided to the subscriber location 105, such as, but not limited to phone services. The accounts may thus include phone, network access and IPTV services and may be used to provide access to the mosaics of live views of traffic services as described further herein. Furthermore, in exemplary embodiments, one of the devices (e.g., the communications device 110, the subscriber computer 120) can be provisioned for the network services described herein by associating a device identifier of the communications device with a respective account. The account, in turn, identifies each of the communications devices, such as the communications device 110, belonging to the community and provides other information as described herein.

In exemplary embodiments, the system 100 can further include a mosaics of live views of traffic services client 116. The mosaics of live views of traffic services client 116 can reside on several components of the system 100, such as, but not limited to the set top box 115, the subscriber computer 120, the IPTV infrastructure 140, and the IPTV gateway. As illustrated, the mosaics of live views of traffic services client 116 resides on the set top box 115. In exemplary embodiments, as further described herein, the a mosaics of live views of traffic services client 116 can store the subscriber specific data/templates/traffic routes, provide interaction with the remote control 111, and control interaction with the IPTV gateway 145. Also, in the case of realtime video cameras, as described further herein, the mosaics of live views of traffic services client 116 can also activate a media player or viewport for each streaming video camera displayed on the screen of the communications device 110.

As shown in FIG. 1 a host server 125 is in communication with an authentication server 130, and with the communications device 110 and the subscriber computer 120 at the subscriber location 105, via a network 135. The host server 125 could be part of an IPTV infrastructure 140 or other networks such as the network 135 (e.g., the Internet). The host server 125 may be implemented using a high-speed processing device (e.g., a computer system) that is capable of handling high volume activities conducted via communications devices (e.g., the communications device 110, the subscriber computer 120), and other network entities (e.g., the authentication server 130). The host server 125 may be implemented by a network service provider, content service provider, or other enterprise.

The network 135 can be an IP-based network for communication between a content server 160 (discussed further below) and clients using communication devices such as but not limited to the communications device 110 (via the set top box 115, for example). The network 135 can be implemented to transmit content from the content services provider server 160 to the subscriber location 105 via a broadband connection, for example. In exemplary embodiments, the network 135 can be a managed IP network administered by a service provider. The network 135 can also be implemented in a wireless fashion, e.g., using wireless protocols and technologies, such as Wi-Fi, Wi-Max, etc. The network 135 can also be a cellular communications network, a fixed wireless network, a wireless local area network (LAN), a wireless wide area network (WAN), a personal area network (PAN), intranet, metropolitan area network, Internet network, or other similar type of network environment or other suitable network system and includes equipment for receiving and transmitting signals. In other exemplary embodiments, the network 135 can be a circuit-switched network such as a standard public switched telephone network (PSTN).

In exemplary embodiments, one of the devices, such as the communications device 110 can be used to establish account services, as mentioned above, which is managed by the provider enterprise of the host server 125. An account record may be generated for the subscriber at the subscriber location 105 which identifies the subscriber and the account for the services (e.g., basic account services as described above and mosaics of live views of traffic services described herein). Account information and records may be stored in a storage device accessible by the host server 125, such as a storage device 127. According to exemplary embodiments, the host server 125 implements one or more applications for establishing and utilizing a mosaic of live views of traffic services service account. These one or more applications are collectively referred to herein as a mosaic of live views of traffic services application 126. It is appreciated that the mosaic of live views of traffic services application 126 can reside wholly on the host server 125 or partially on other servers (such as the content server 160) and other network components of the system 100, such as the set top box 115. A mosaics of live views of traffic service account may thus be created for a community of communications devices (e.g., the communications device 110, the subscriber computer 120) to enable the communications devices to implement the mosaics of live views of traffic services as described herein.

In exemplary embodiments, the authentication server 130 may be implemented using a high-speed processing device (e.g., a computer system) that is capable of handling high volume activities conducted via communications devices, such as the communications device 110, and other network entities (e.g., the IPTV infrastructure 140, an IPTV gateway 145) via one or more networks (e.g., the network 135). The authentication server 130 receives requests from one or more devices from the subscriber location 105 either to establish a mosaic of live views of traffic services account or to access network services, such as the mosaic of live views of traffic services application 126. The authentication server 130 may implement authentication software for restricting or controlling access to network services provided by the host system 125. The authentication server 130 may be in communication with a customer identity system (CIS) database 131, which stores subscriber credentials (e.g., subscriber names and passwords) established via the mosaics of live views of traffic services application 126.

As discussed above, the system 100 of FIG. 1 includes the subscriber location 105, such as the subscriber's household. The subscriber location 105 can include the communications device 110 (e.g., an IPTV-enabled television) in communication with the set top box 115. The subscriber location 105 can further include a remote control 111 for control and navigation of the communications device 110. It is appreciated that several other subscriber devices are possible at the subscriber location 105 such as call devices, including but not limited to, a wireline phone, a cellular telephone, SIP telephone, dual-mode mobile telephone, personal digital assistant (PDA), etc., which can interact with the IPTV infrastructure 140 and the IPTV gateway 145. It is understood by those skilled in the art that the subscriber computer 120 can include input and output devices, such as but not limited to a mouse, a keyboard, etc. It is appreciated that in other exemplary embodiments, call devices can also implement the mosaics of live views of traffic services. It is further appreciated that the communications devices, such as the communications device 110, described herein can have a network address associated with the communications devices such as an addressable uniform resource locator (URL), an Internet address, etc.

The system 100 can implement mosaic of live views of traffic services such that desired travel routes can be managed and viewed through the subscriber's IPTV-enabled device, such as the communications device 110, via the set top box 115, the subscriber computer 120 or other suitable device. As such, the system 100 may further include the IPTV gateway 145 that is in communication with the IPTV infrastructure 140. The IPTV infrastructure 140 and the IPTV gateway 145 are used in conjunction to communicate via the network 135. For example, a suitable device (e.g., the communications device 110, (he subscriber computer 120) at the subscriber location 105 can use the IPTV infrastructure 140 and the IPTV gateway 145 to communicate with the content server 160 to access data from a database 165 coupled to the content server 160.

In exemplary embodiments, the IPTV infrastructure 140 can be an IP-based network that receives network data (e.g., traffic view data) from the content server 160, and delivers the network data to the set top box 115 for display or other rendering on the communications device 110. Alternatively, the network data can be for display or rendering on the subscriber computer 120 or other suitable device. The IPTV gateway 145 is in communication with the host server 125 and the content server 160 (e.g., a server associated with a government municipality). In exemplary embodiments, the IPTV gateway 145 communicates with the host server 125 and the content server 160 via the network 135. In other exemplary embodiments, the IPTV gateway 145 may be coupled to the host server 125 and/or the content server 160 directly (e.g., T1 lines, proprietary connection, etc.)

In exemplary embodiments, as discussed above, the IPTV infrastructure 140 provides an interface between the subscriber location 105 and the IPTV gateway 145. In exemplary implementations, a notification/preferences server 141 and a terminal server 142 operate to interface communication between the subscriber location 105 via the set top box 115, and the IPTV gateway 145. For example, in exemplary implementations, the set top box 115 can provide a unique identification number so that the IPTV gateway 145 can route the network data to the set top box 115, such as a message passed between the notification server 141 and the set top box 115. The IPTV gateway 145 provides an interface between the host and content servers 125, 160, and the IPTV infrastructure 140 and the subscriber location 105. Furthermore, in exemplary embodiments, the IPTV gateway 145 handles notifications to the IPTV subscriber location 105 and can further provide a history of the notifications. For example, as discussed above the mosaic of live views of traffic services application 126 can reside partially or wholly on the host server 125. In exemplary embodiments, the mosaics of live views of traffic services application 126 can further reside partially or wholly on the IPTV gateway 145 and/or the set top box 115. When the subscriber sets up his/her mosaic of live views of traffic on the communications device 110 (or other device in the subscriber location 105), one of the network components of the system 100 (e.g., the set top box 115, the IPTV gateway 145, the host server 125) can store the specific mosaic that the subscriber has created. As such, if the mosaic is stored on the IPTV gateway 145, messages and notifications can be passed between the subscriber location 105 and the IPTV gateway 145 that include present mosaics and historic mosaics that the subscriber has created in the past.

In exemplary embodiments, the IPTV gateway 145 can further interface with the various system 100 elements as described herein. For example, the IPTV gateway 145 is in communication with the authentication server 130 to pass notifications and messages (e.g., SMS messages) regarding permissions to create and edit mosaics. For example, different members of the subscriber location 105 who share account services may have different traffic routes of interest. For example, one member may have a first work route and another member may have a second work route. As such, each member can retrieve and edit those different routes and be properly authenticated to retrieve and edit those routes. In exemplary embodiments, the IPTV gateway 145 can further be in communication a media server 150 and a media encoder 155 for data encoding. For example, some network data obtained from the content server 160 may be in a format that is not compatible for display and rendering on one or more of the communication devices, such as the communications device 110, at the subscriber location 105. As such, the media server 150 can be accessed by the IPTV gateway 145 upon a determination that a data request by the subscriber location 105 would not be compatible with any of the communications devices, such as the communications device 110. The media server 150 can them implement the media encoder 155 to properly encode the network data for reception on the communication device 110 at the subscriber location 105.

In exemplary embodiments, the IPTV gateway 145 can include a back end 146 and a front end 147. The front end 147 can be used to implement various provisioning activities such as but not limited to initial provisioning of IPTV addresses for the devices, such as the communications device 110, at the subscriber location 105. The back end 146 can be implemented for many of the mosaic of live views of traffic services, such as communicating with the content server 160, retrieving traffic view network data from the database 165, and passing messages and notification to the IPTV gateway 145. As such, the back end 146 can include various elements including but not limited to a caller ID handler, SMS handler, message handler, and provisioning handler.

In exemplary embodiments, as discussed above, the system 100 further includes the content server 160, which is in communication with the IPTV gateway 145 via the network 135. In exemplary embodiments, the content server 160 is associated with a government municipality, such as a department of transportation that governs roads and/or public transportation. The content server 160 is coupled to the database 165. In exemplary embodiments, the content server 160 can store and manage views of traffic that have been acquired by a media device 170 (e.g., a camera, a traffic cam). In exemplary embodiments, the media device 170 acquires data (e.g., still images, motion images) of a roadway 175 (e.g., highways, roads, intersections) The acquired data can be stored in the database 165. Upon a request from the subscriber location 105, the IPTV gateway 145 can coordinate obtaining the acquired data from the database 165 and provide the acquired data for display and rendering at the subscriber location 105. It is appreciated that the coordination of acquiring the data and ultimately displaying the data on the communications device 110 (or other device) is implemented via the mosaic views of live traffic application 126. In exemplary embodiments, each of the media devices 170 has a network address, such as a URL or Internet address. As such, the network traffic data can be specifically located through the addressable media device locations on the network 135. In further exemplary embodiments, it is understood that the content server 160 and the database 165 can be associated with and managed by other entities other than government municipalities (e.g., a private enterprise, etc.)

Figure 2:
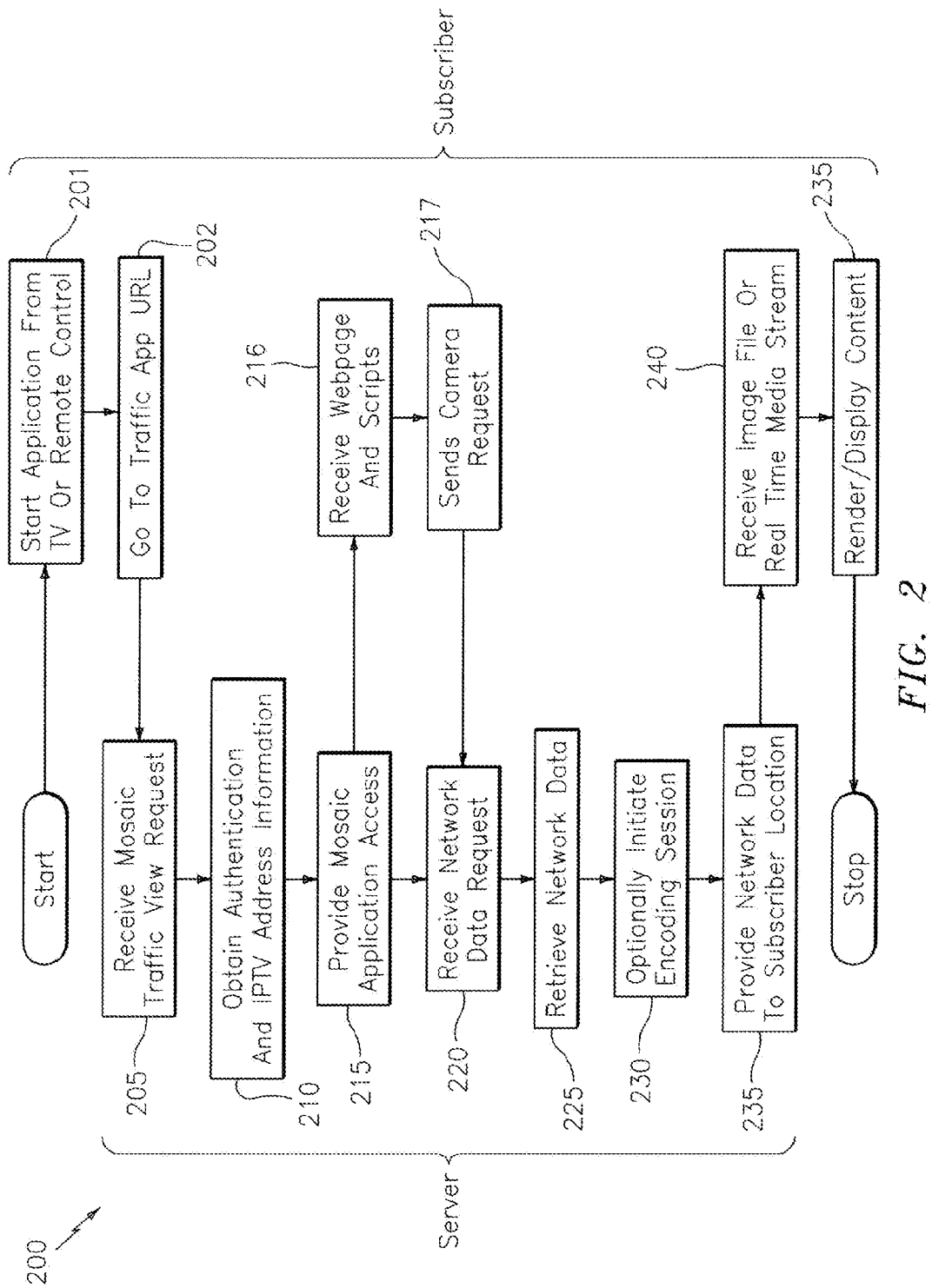
FIG. 2 illustrates a flow chart of an exemplary method of providing mosaics of live views of traffic via Internet Protocol Television.

As described above, the system 100 can be implemented to provide one or more mosaics of live views of traffic to the subscriber location 105. FIG. 2 illustrates a flow chart of an exemplary method 200 of providing mosaics of live views of traffic via IPTV. FIG. 2 illustrates both the server side and the subscriber side of the method 200.

At step 201, the subscriber can initiate the mosaics of live views of traffic services client 116, which accesses the traffic URL at step 202. At step 205, the IPTV gateway 145 receives a mosaic traffic view request. As discussed above, the request can be initiated by a subscriber via the communications device 110. It is therefore appreciated that the request is initiated by implementing the mosaic views of live traffic application 126. At step 210, the IPTV gateway 145 and the host server 125 can access account information from the accounts database 127, which can include a network address for the requesting device (e.g., the set top box 115). The authentication server 130 can in turn confirm that the requesting device is authorized to make the request.

At step 215, the IPTV gateway 145 can provide the necessary applications to enable display and rendering of the mosaics of live views of traffic on the communications device 110, thereby providing full access to the mosaic views of live traffic application 126. The subscriber can then navigate the communications device 110 (or other suitable device such as the subscriber computer 120) using the remote control 111 to determine the mosaic that the subscriber wants to use to view his/her traffic route. It is appreciated that the user can be presented with an initial list of routes that are available from the database 165. It is therefore also appreciated that the IPTV gateway 145 can make an initial request from the content server 160 at step 210. Concurrently, at step 216, the communications device 110 receives the necessary webpages and scripts to render the mosaic views. At step 217, the mosaics of live views of traffic services client 116 sends a camera data request. Once the subscriber has chosen the desired route mosaic on the communications device 110, the IPTV gateway 145 receives a network data request at step 220.

At step 225, the IPTV gateway 145 can retrieve the network data from the database 165 via the content server 160. In exemplary embodiments, the network data can be XML still image data acquired by one or more media devices (e.g., the media device 170) associated with the desired route (e.g., the roadway 175) for display on the mosaic. It is appreciated that the network data can be a variety of other formats such as HTM/HTML or .jpg. In other exemplary embodiments, the network data may be motion data that can be streamed to the set top box 115, for example. Regardless of the format, if the communications device 110 is not able to support the format, the media server 150 and media encoder 155 can be implemented to initiate an encoding session at step 230 before the network data is provided for rendering and display on the communications device 110. As such, at step 230 the IPTV gateway 145 can access the media server 150 and the media encoder 155 in order to initiate an encoding session. In one exemplary implementation, the motion image file can be encoded into a suitable format for streaming to the set top box 115. In turn, the media server 150 can store the encoded file until the subscriber has decided to view to the motion image. Thus, at step 230, the IPTV gateway 145 further requests and obtains the encoded file.

At step 235, the IPTV gateway 145 provides the network data to the subscriber location 105. The IPTV gateway 145 can communicate with the IPTV infrastructure to obtain the set top box 115 ID and any preferences for display and rendering of the network data in the mosaic. In exemplary embodiments, TCP communication can be exchanged between the IPTV infrastructure 140 and the IPTV gateway 145 in order to coordinate transfer of the set top box 115 identification, the set top box 115 preferences for display on the communications device 110 and exchange streaming of the network data, for example. As such, at step 240, the images or video stream is received at the subscriber location 105, and the content is rendered on the communications device 110. The network data may be transmitted to the set top box 115 of the IPTV-enabled communications device 110 using, e.g., UDP/HTTP protocols, where it is displayed or otherwise rendered on the IPTV device.

In exemplary embodiments described herein, the mosaic of live traffic views can be displayed or otherwise rendered on communications devices, such as the communications device 110, at the subscriber location 105. In exemplary embodiments, the mosaics can be chosen by navigating on the communications device 110, such as via the remote control 111 on the communications device 110.

Figure 3A:
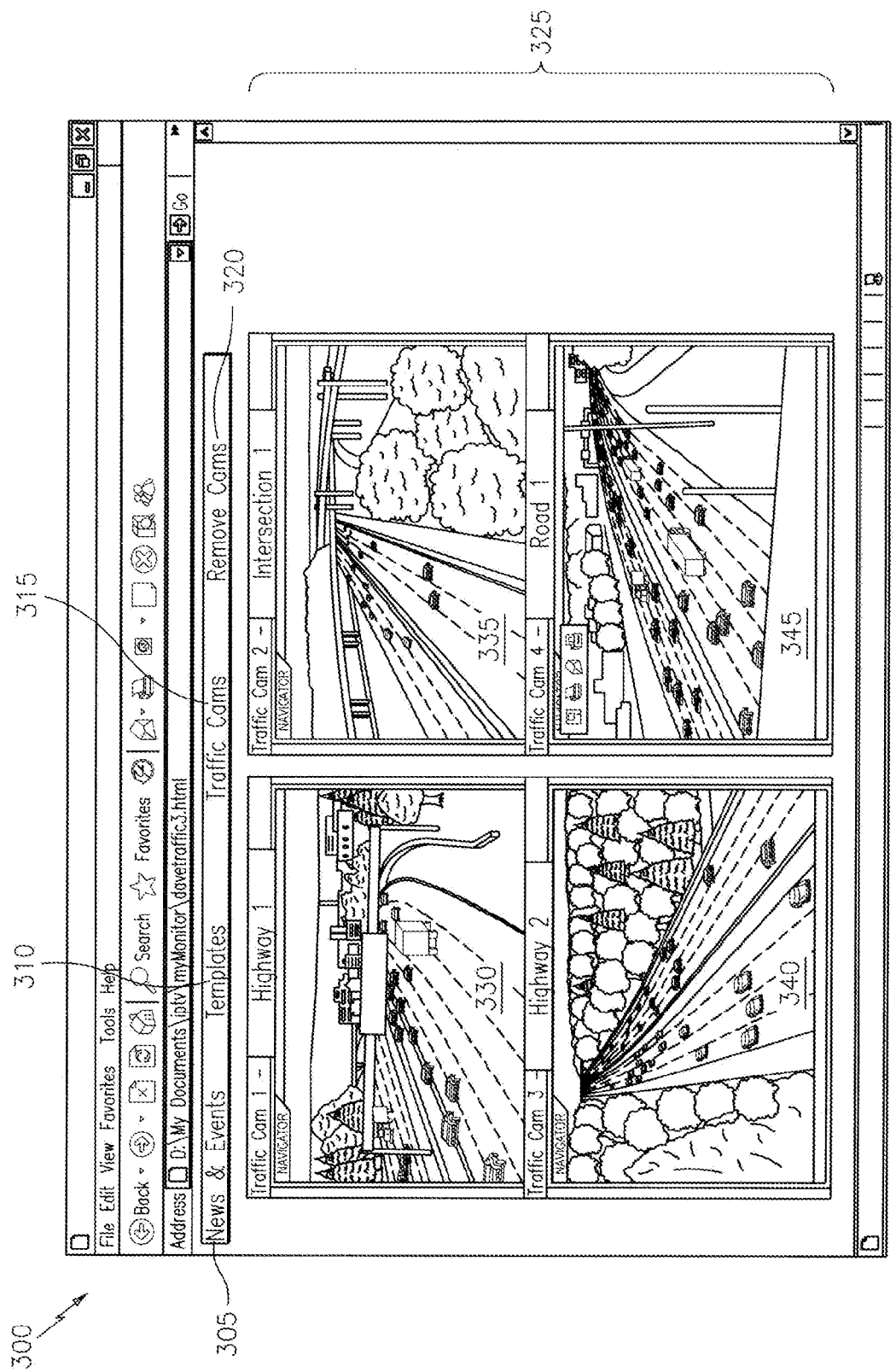
FIG. 3A illustrates a screen shot of an exemplary mosaic of live traffic views in accordance with exemplary embodiments.

FIG. 3A illustrates a screen shot of an exemplary mosaic display 300 of live traffic views in accordance with exemplary embodiments. In exemplary embodiments, the display 300 can include pull down menus 305, 310, 315, 320. A mosaic 325 can include different views 330, 335, 340, 345 of traffic routes. For example, the four views 330, 335, 340, 345 can be included in the mosaic 325, as illustrated. It is understood that in other exemplary embodiments, any number of views can be illustrated in the mosaic 325. The pull down menu 305 "News & Events" can be used to access news or other events data from the network 135, for example, for display on the communications device 110. The pull down menu 310 "Templates" can be used to access previously created mosaics and to create new mosaics. Pull down menu 315 "Traffic Cams" can be used to access different traffic cam views from the database 165. Pull down menu 320 "Remove Cams" can be used to remove traffic views from the mosaic 325. In the present example, "the views "Highway 1" ("Traffic Cam 1") 330, "Intersection 1" ("Traffic Cam 2") 335, "Highway 2" ("Traffic Cam 3") 340, and "Road 1" ("Traffic Cam 4") 345 are illustrated in the mosaic 325.

Figure 3B:
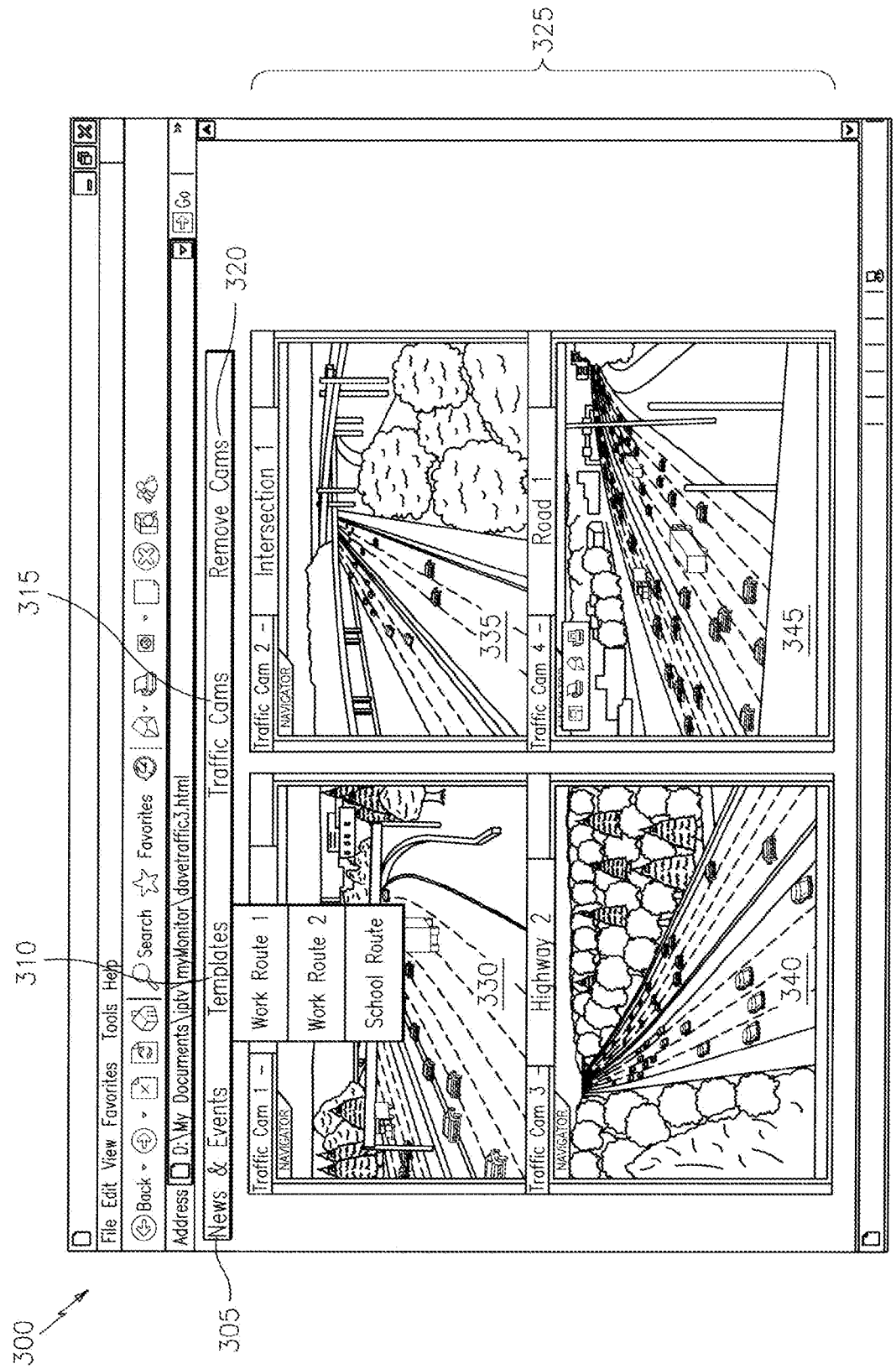
FIG. 3B illustrates another screen shot of an exemplary mosaic of live traffic views in accordance with exemplary embodiments.

FIG. 3B illustrates another screen shot of an exemplary embodiment of the mosaic display 300 of live traffic views. FIG. 3B illustrates the mosaic 325 with the pull down menu 310 activated, thereby displaying pre-set mosaics, for example, "Route 1", "Route 2" and "School Route". When one of the mosaics is selected, the pre-selected traffic cam views 330, 335, 340, 345 are displayed as the mosaic 325, such as "Highway 1" ("Traffic Cam 1"), "Intersection 1" ("Traffic Cam 2"), "Highway 2" ("Traffic Cam 3"), and "Road 1" ("Traffic Cam 4") as illustrated. Another option "Save Mosaic" can be selected to save the presently selected views 330, 335, 340, 345, which can be chosen from the Traffic Cams pull down menu 315, which is now discussed.

Figure 3C:
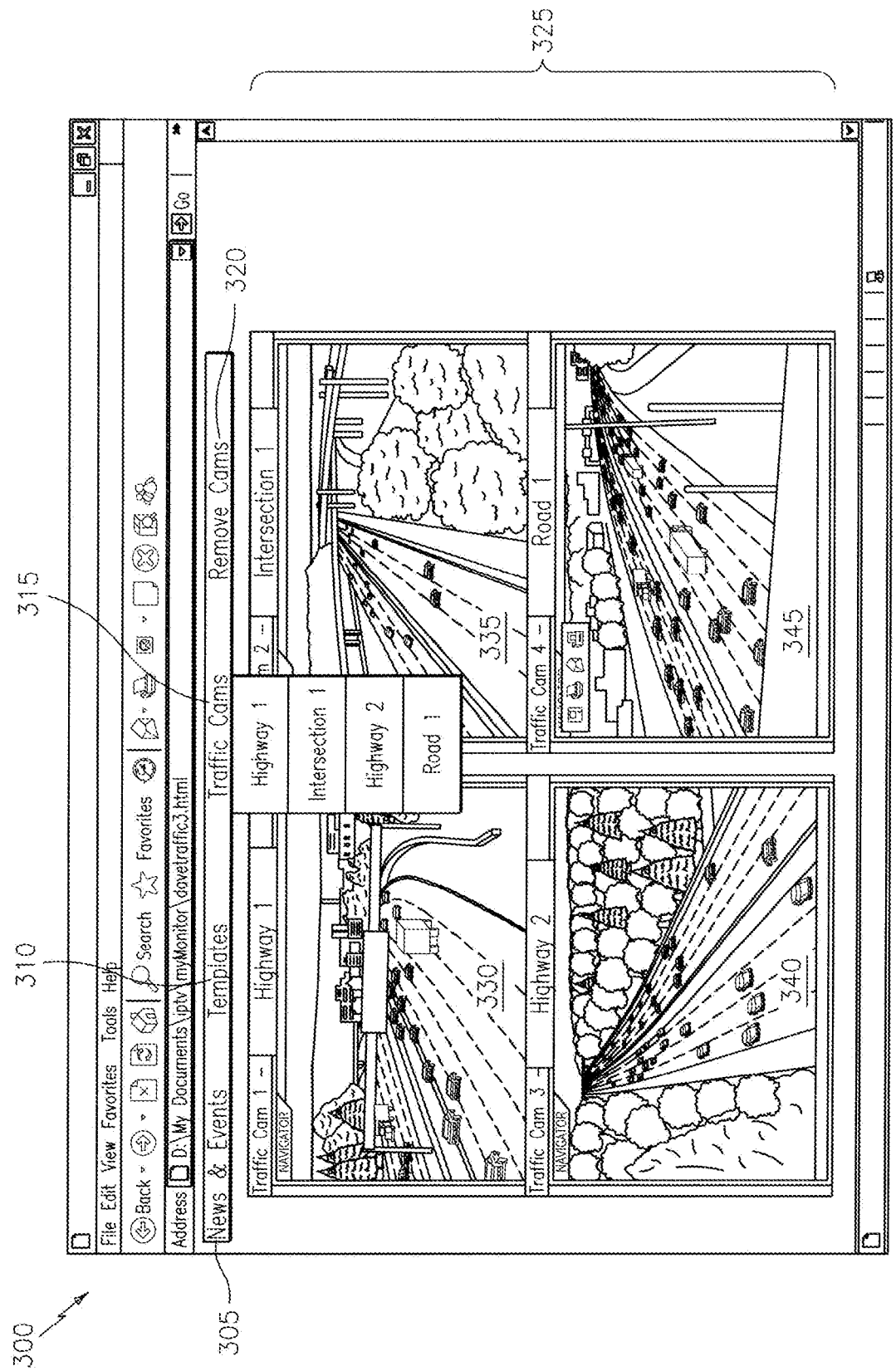
FIG. 3C illustrates another screen shot of an exemplary mosaic display of live traffic views in accordance with exemplary embodiments.
Figure 3D:
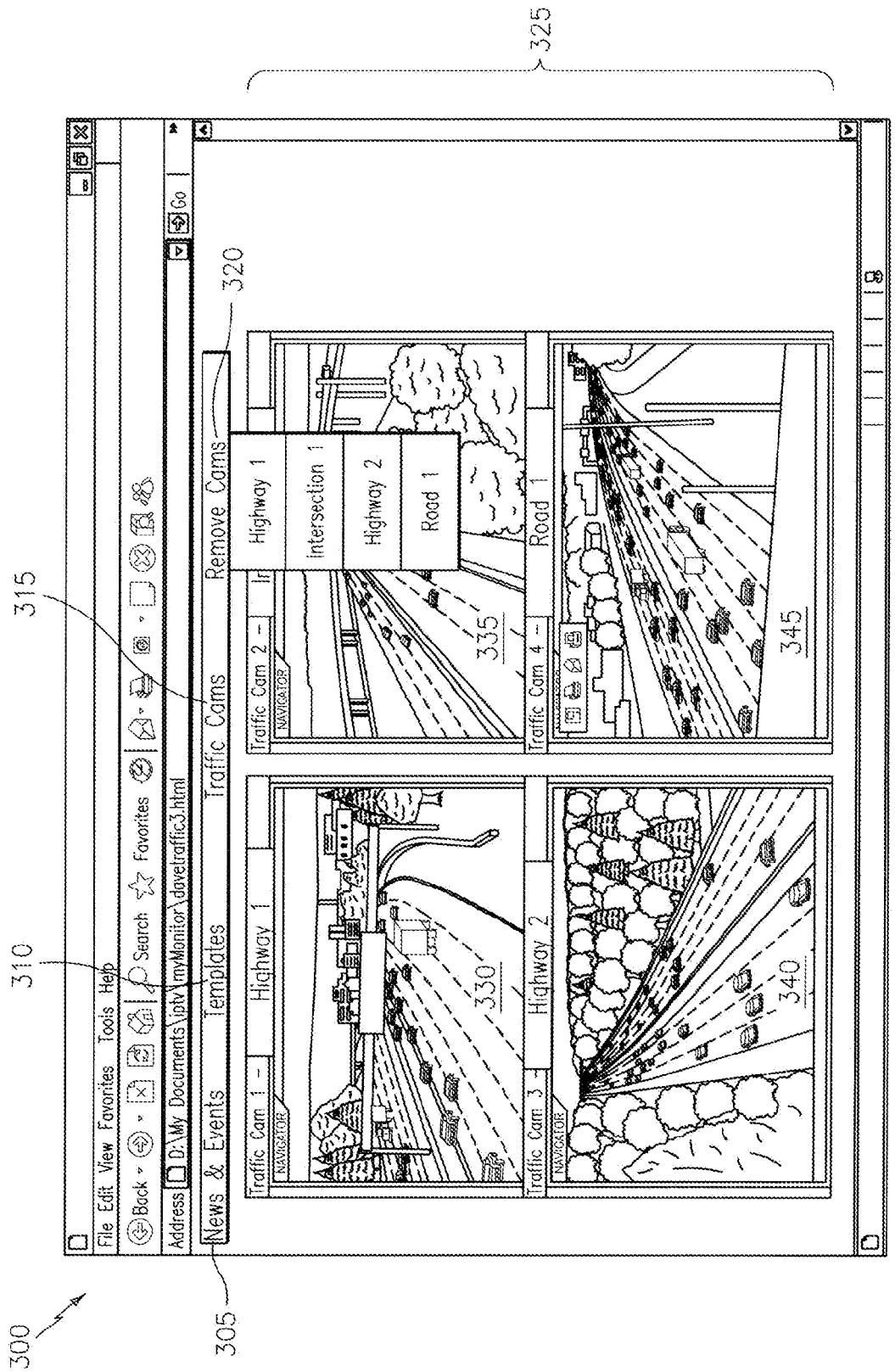
FIG. 3D illustrates another screen shot of an exemplary mosaic display of live traffic views in accordance with exemplary embodiments.

FIG. 3C illustrates another screen shot of an exemplary embodiment of the mosaic display 300 of live traffic views in accordance with exemplary embodiments. FIG. 3C illustrates the mosaic 325 with the pull down menu 315 activated, thereby displaying the pre-set traffic views 330, 335, 340, 345, for example, "Highway 1". "intersection 1", "Highway 2" and "Road 1". It is appreciated that many more traffic views can be provided in the pull down menu 315, which are determined by the images acquired at locations having the media device 170. As the subscriber selects the different traffic views from the pull down menu 315, the mosaic 325 becomes populated with the different views which, as discussed above, are provided from the database 165. When the subscriber has satisfactorily selected the traffic views for the mosaic 325, the subscriber can choose to save the new mosaic 325, by selecting the "Save Mosaic" option from the "Templates" pull down menu 310, as discussed with respect to FIG. 3B. Similarly, the subscriber can choose to remove traffic views from a particular mosaic. As such, the subscriber can activate the "Remove Cams" pull down menu 320. FIG. 3D illustrates another screen shot of an exemplary embodiment of the mosaic display 300 of live traffic views in accordance with exemplary embodiments. FIG. 3D illustrates the mosaic 325 with the pull down menu 320 activated, thereby displaying views that can be removed from the mosaic 325, for example, "Highway 1", "Intersection 1", "Highway 2" and "Road 1". Therefore, the subscriber can select those traffic views to remove from the mosaic 325.

Figure 4A:
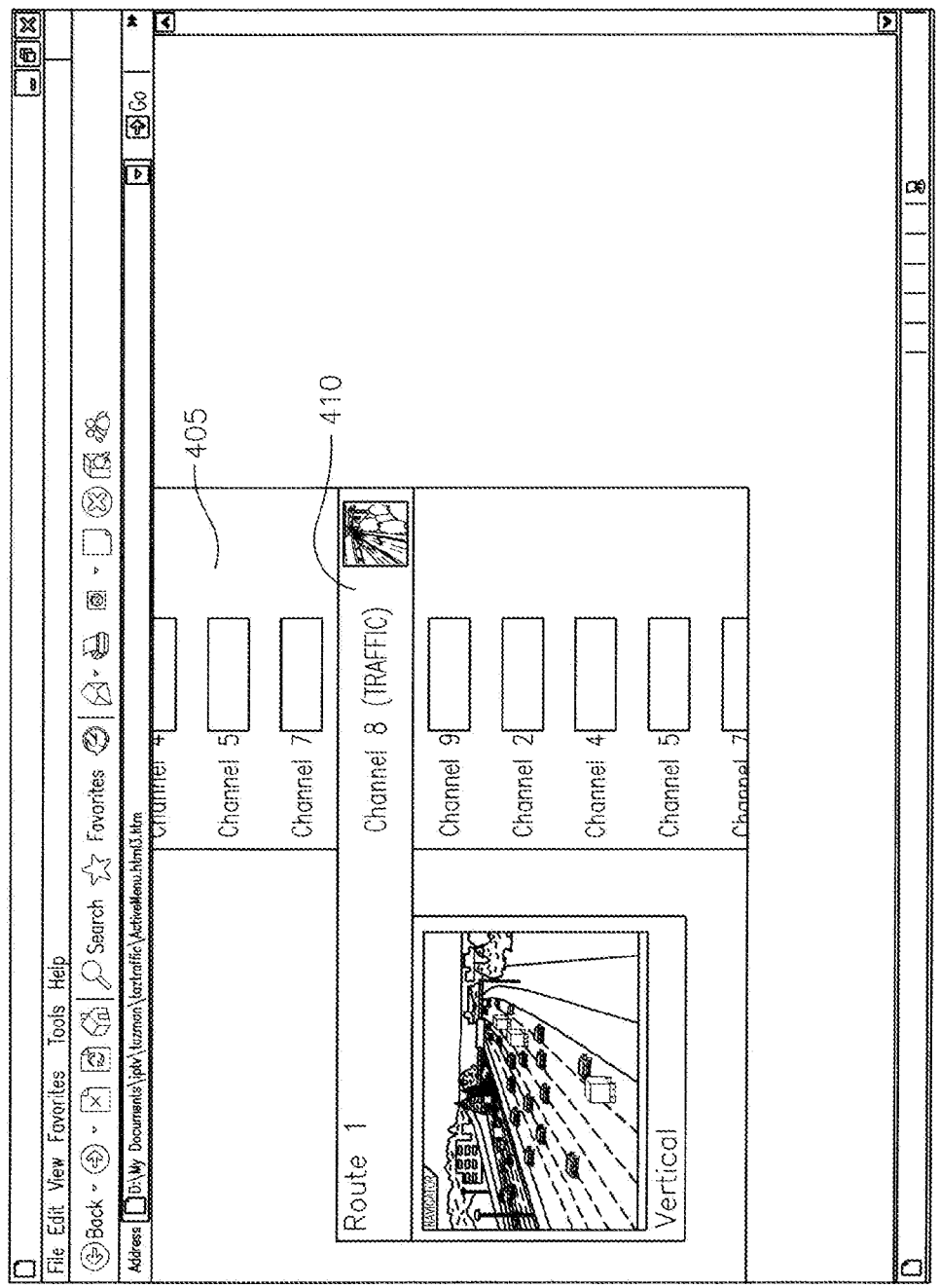
FIG. 4A illustrates a screen shot of an alternate exemplary mosaic display of live traffic views in accordance with exemplary embodiments.

FIG. 4A illustrates a screen shot of an alternate exemplary mosaic display 400 of live traffic views in accordance with exemplary embodiments. FIG. 4A illustrates a pull down menu 405 of channel listings. It is therefore appreciated that the subscriber can activate the pull down menu 405 to obtain a listing of channels for viewing on the communications device 110. FIG. 4A further illustrates that a "channel" 410 dedicated to traffic, that is, "Channel 8 (TRAFFIC)" can be selected. When the subscriber selects the channel 410 the mosaic of live views of traffic application 126 is invoked, thereby allowing the user to generate a mosaic, similar to as described above with respect top FIGS. 3A-3D. It is therefore appreciated that the pull down menu 405 allows the subscriber not only to select IPTV channels, but also to select applications to invoke (e.g., the mosaics of live views of traffic application 126 via the channel 410) As described above, the subscriber can use the remote control 111 to navigate the communications device 110, use the subscriber computer 120 to navigate the computer display, or use other suitable navigational tools on other communications devices.

Figure 4B:
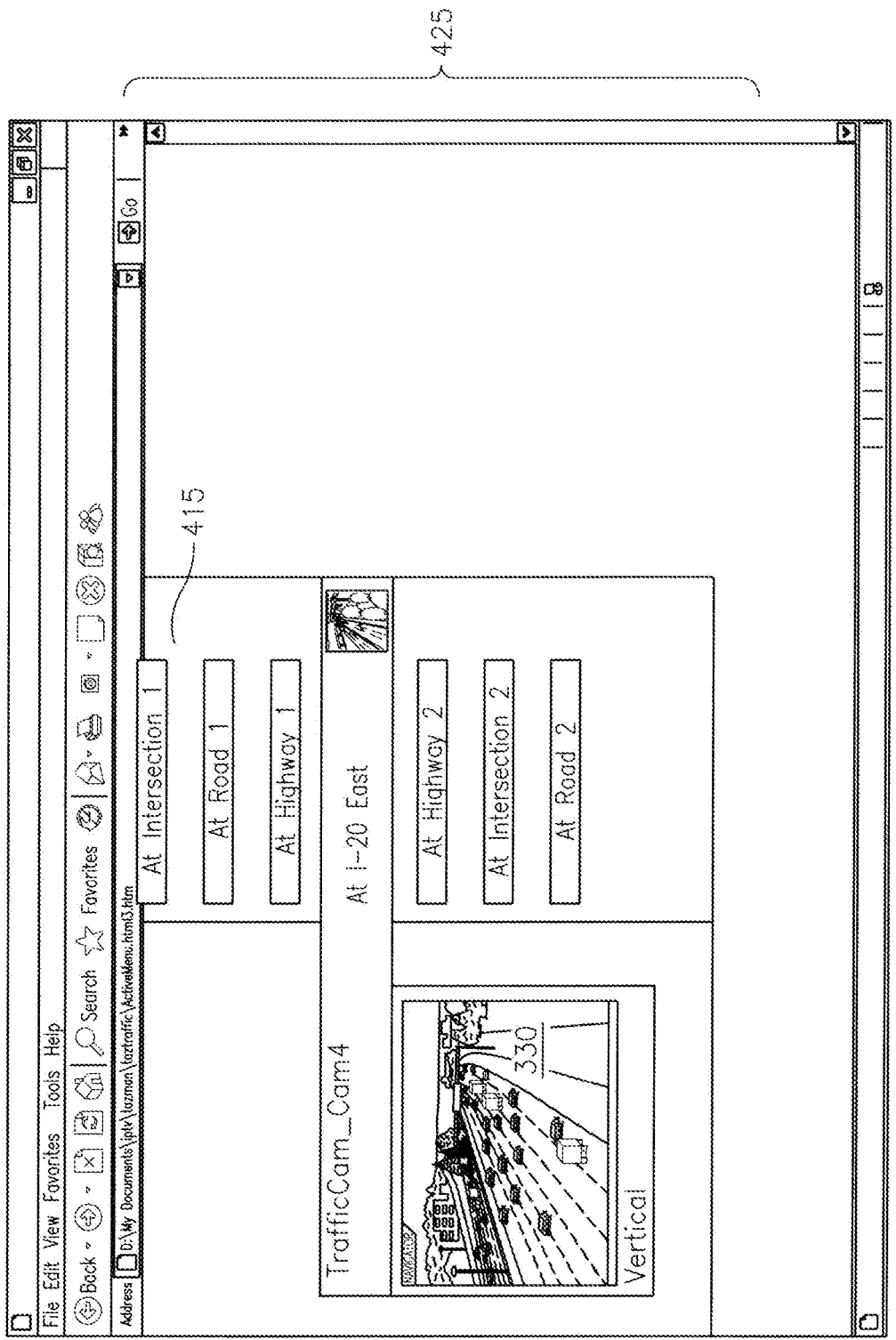
FIG. 4B illustrates a screen shot of the alternate exemplary mosaic display of live traffic views of FIG. 4A in accordance with exemplary embodiments.

When the subscriber selects the channel 410, a new screen may be generated on the communications device 110. FIG. 4B illustrates a screen shot of the alternate exemplary mosaic display 400 of live traffic views of FIG. 4A in accordance with exemplary embodiments. FIG. 4B illustrates a pull down menu 415 of traffic views. It is therefore appreciated that the subscriber can activate the pull down menu 415 to obtain a listing of traffic views for viewing on the communications device 110 to build a mosaic 425. When the subscriber selects one or more of the traffic views, the IPTV gateway 145 retrieves data from the database 165 for display on the communications device 110, similar to as described above with respect top FIGS. 3A-3D. As described above, the subscriber can use the remote control 111 to navigate the communications device 110 use the subscriber computer 120 to navigate the computer display, or use other suitable navigational tools on other communications devices.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A network-based method for providing traffic views, the method comprising:
    receiving a request to display, requested from a set top box connected to a television at a subscriber location, a traffic views mosaic corresponding to a particular traffic route stored on the set top box, the set top box, connected to the television, is configured to provide television services to the subscriber location;
    retrieving traffic views data of the traffic views mosaic corresponding to the particular traffic route preset with pre-selected traffic cameras of live views of traffic on roads; and
    providing, to the set top box connected to the television, the traffic views data corresponding to the particular traffic route preset with the pre-selected traffic cameras of the live views of the traffic on the roads;
    wherein the traffic views mosaic corresponding to the particular traffic route is created by a user of the set top box connected to the television;
    wherein the particular traffic route is stored by the user on the set top box; and
    wherein the particular traffic route is configured to be retrieved and edited by the user after proper authentication;
    wherein the set top box is configured to select various channels for viewing of the television; and
    wherein one of the various channels is a traffic channel that is dedicated to traffic.

2. The method as claimed in claim 1 further comprising providing a plurality of traffic views corresponding to the particular traffic route for development of the traffic views mosaic.

3. The method as claimed in claim 1 further comprising initiating an encoding session to translate the traffic views data for reception on the set top box.

4. The method as claimed in claim 1 wherein the traffic views data is provided to a communications device address;

and wherein the traffic views mosaic corresponding to the particular route is previously created and saved by the user of the set top box.

5. The method as claimed in claim 4 wherein the communications device address includes a uniform resource locator;
   wherein the particular traffic route comprises a first user created route and a second user created route stored by the user; and
      wherein the first user created route is a work route and the second user created route is an alternative work route.

6. The method as claimed in claim 1, wherein the particular traffic route preset with the pre-selected traffic cameras of the live views is of vehicular traffic on highways; and wherein the particular traffic route preset with the pre-selected traffic cameras of the live views is of the vehicular traffic at intersections of the roads.

7. A system for providing traffic views to a set top box, the system comprising:
   a computer processing device; and
   a mosaic of live view of traffic services application executing on the computer processing device, the mosaic of live view of traffic services application:
   receiving a request to display, requested from the set top box connected to a television at a subscriber location, a traffic views mosaic corresponding to a particular traffic route stored on the set top box, the set top box, connected to the television, is configured to provide television services to the subscriber location;
   retrieving traffic views data of the traffic views mosaic corresponding to the particular traffic route preset with pre-selected traffic cameras of live views of traffic on roads; and
   providing, to the set top box connected to the television, the traffic views data for the particular traffic route preset with the pre-selected traffic cameras of the live views of the traffic on the roads;
   wherein the traffic views mosaic corresponding to the particular traffic route is created by a user of the set top box connected to the television;
   wherein the particular traffic route is stored by the user on the set top box; and wherein the particular traffic route is configured to be retrieved and edited by the user after proper authentication;
   wherein the set top box is configured to select various channels for viewing of the television; and
   wherein one of the various channels is a traffic channel that is dedicated to traffic.

8. The system as claimed in claim 7 wherein the mosaic of live view of traffic services application provides a plurality of traffic views for development of the traffic views mosaic.

9. The system as claimed in claim 7 wherein the mosaic of live view of traffic services application initiates an encoding session to translate the traffic views data for reception on the set top box.

10. The system as claimed in claim 7 wherein the traffic views data is provided to a communications device address.

11. The system as claimed in claim 10 wherein the communications device address includes a uniform resource locator.

12. A computer program product for providing network services to a set top box, the computer program product comprising a non-transitory computer-readable storage medium, the non-transitory computer-readable storage medium including instructions for causing a computer to implement a method, the method comprising:
   receiving a request to display, requested from the set top box connected to a television at a subscriber location, a traffic views mosaic corresponding to a particular traffic route stored on the set top box, the set top box, connected to the television, is configured to provide television services to the subscriber location;
   retrieving traffic views data of the traffic views mosaic corresponding to the particular traffic route preset with pre-selected traffic cameras of live views of traffic on roads; and
   providing, to the set top box connected to the television, the traffic views data corresponding to the particular traffic route preset with the pre-selected traffic cameras of the live views of the traffic on the roads;
   wherein the traffic views mosaic corresponding to the particular traffic route is created by a user of the set top box connected to the television;
   wherein the particular traffic route is stored by the user on the set top box; and wherein the particular traffic route is configured to be retrieved and edited by the user after proper authentication;
   wherein the set top box is configured to select various channels for viewing of the television; and
   wherein one of the various channels is a traffic channel that is dedicated to traffic.

13. The computer program product as claimed in claim 12 wherein the method further comprises providing a plurality of traffic views for development of the traffic views mosaic.

14. The computer program product as claimed in claim 12 wherein the method further comprises initiating an encoding session to translate the traffic views data for reception on the set top box.

15. The computer program product as claimed in claim 12 wherein the traffic views data is provided to a communications device address.

16. The computer program product as claimed in claim 15 wherein the communications device address includes a uniform resource.

* * * * *